(12) United States Patent
Harwood et al.

(10) Patent No.: US 6,683,950 B1
(45) Date of Patent: Jan. 27, 2004

(54) COVER FOR A REMOTE TERMINAL

(75) Inventors: Walter T. Harwood, Streamwood, IL (US); Timothy P. Demel, Prospect Heights, IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 09/242,220

(22) PCT Filed: Jun. 25, 1997

(86) PCT No.: PCT/US97/11130
§ 371 (c)(1),
(2), (4) Date: Feb. 9, 1999

(87) PCT Pub. No.: WO98/59482
PCT Pub. Date: Dec. 30, 1998

(51) Int. Cl.[7] .......................... H04M 1/00; H04M 9/00; H05K 1/00
(52) U.S. Cl. .......................... 379/413.02; 379/413.04; 439/76.1; 439/76.2
(58) Field of Search ................. 379/413.01–413.04; 439/76.1, 76.2, 49, 709, 718–723, 252

(56) References Cited

U.S. PATENT DOCUMENTS

| | | | |
|---|---|---|---|
| RE30,220 E | * 2/1980 | O'Neill | |
| 4,741,032 A | * 4/1988 | Hampton | |
| 4,979,209 A | * 12/1990 | Collins et al. | |
| 5,207,583 A | 5/1993 | DeBalko et al. | |
| 5,416,837 A | * 5/1995 | Cote et al. | |
| 5,479,505 A | * 12/1995 | Butler et al. | |
| D366,456 S | 1/1996 | Rodriguez et al. | |
| 5,623,542 A | * 4/1997 | Schneider et al. | |

* cited by examiner

Primary Examiner—Forester W. Isen
Assistant Examiner—Ramnandan Singh
(74) Attorney, Agent, or Firm—Leydig, Voit & Mayer, Ltd.

(57) ABSTRACT

An improved cover is provided for a remote terminal base, the new cover defining an interior cavity having means for mounting a 400-series card electronic card-module therein. The improved cover may replace a standard flat cover on the remote terminal base to facilitate the implementation of a 400-series card module. The interior cavity of the improved cover is deep enough to accommodate the card module and has a hinged intermediate door to which the card module is mounted. When the door is opened, card guides on the door slidably receive the card module. The door is then closable to sealably encase the card module within the cover.

23 Claims, 6 Drawing Sheets

COVER FOR A REMOTE TERMINAL

FIELD OF THE INVENTION

The present invention generally relates to a telephone service remote terminal and more particularly to a cover for a remote terminal which facilitates the mounting and enclosure of an additional circuit module.

BACKGROUND OF THE INVENTION

Demand for telecommunication service has greatly increased in recent years in response to the use of telephone lines for a variety of digital and analog voice, data and video applications. Such line demand promises only to increase with growing communication needs such as the Internet.

Communication companies have an embedded infrastructure containing only a fixed number of lines connecting to customers. Therefore, in order to avoid installing additional wiring lines to keep up with growing user demand, various multiplexing techniques have been developed which permit the transmission of several channels over each line. The increase of transmission capacity over existing lines has been a major focus of telecommunications developments.

In user environments involving numerous customer lines, such as commercial office buildings or apartment buildings, multiplexing circuitry has been used to convert each subscriber line signal into multiple user signals. For example, one currently popular multiplexing technology is known as digital dual-line ("DDL") (one in/two out). DDL circuitry essentially enables one subscriber line to carry the signals of two telephone customer lines. This advantageously increases the number of circuits for the same number of lines.

The enhanced electronic circuitry to carry out DDL multiplexing may be contained within a standard-configuration circuitry module known as a 400-series card module. In addition to packaging DDL circuitry, card modules are widely used to package circuitry for various other technologies as well, such as HDSL ("high density subscriber line"), ADSL ("asynchronous digital subscriber line"), RDSU ("rapid download/slow upload"), and ISDN ("integrated services digital network") circuitry. In all of these applications, the standard card module facilitates a convenient "plug-in" installation of the electronics.

While card modules have been used to implement advanced transmission techniques in high-density telecommunication environments, such modules have not been used in applications having relatively few user lines, such as individual houses. Instead, each of these locations is usually provided with at least one wall-mounted box known as a remote terminal (known in the industry as an "RT") which houses a connection interface between a main telephone company line and each individual user line.

In an increasing trend, occupants of houses and apartments are installing additional user lines for computer modems, fax machines, or simply for additional personal or business telephone lines at home. This installation of new user lines conventionally requires the routing of corresponding additional subscriber lines into a remote terminal. Unfortunately, there has been no practical means to date for implementing advanced electronics at an individual customer site to avoid the increasing number of relatively bulky remote terminals.

In order to provide upgraded modern service to customers having standard remote terminals, it is desirable to implement within a remote terminal the type of modern telecommunications electronics provided in card modules. To do so would also reduce the number of subscriber lines routed into a multiple-user remote terminal, because the upgraded circuitry could multiplex a single subscriber line into multiple user lines. Unfortunately, an existing remote terminal unit does not have enough internal space to mount a standard card module, and redesigning a completely new remote terminal base to permit the mounting of a card module adjacent to the existing base-mounted connector components would be impractical because many standard remote terminals are in use, and complete replacement of each unit would involve tremendous resources for their manufacture and reinstallation at each facility. Accordingly, a need exists for a means to adapt conventional remote terminal wiring for use with upgraded circuitry in a manner which maximizes the utilization of a conventional remote terminal structure.

SUMMARY OF THE INVENTION

A primary object of the invention is to provide a remote terminal capable of housing advanced electronic circuitry.

Another object of the invention is to adapt existing remote terminal equipment for upgraded operation with modem electronic telecommunication circuitry.

A related object is to provide a means for mounting such circuitry with existing remote terminal structure.

In accordance with the invention, a remote terminal is provided for receiving a standard circuitry module for manipulating a signal. The remote terminal includes an improved cover which can also be substituted for a conventional cover on a standard remote terminal. The improved cover of the invention has an enlarged interior capacity for accommodating the installation of a circuitry module to operate in conjunction with existing components conventionally mounted in the base. Preferably, the improved cover is adapted to connectably receive a standard-sized card module.

An advantage of the invention is that the cover may be used with an existing remote terminal base to upgrade the electronic circuitry without completely replacing the entire existing remote terminal structure.

These and other features and advantages of the invention are described in, and will be apparent from, the detailed description of the preferred embodiments and from the accompanying drawings.

DETAILED DESCRIPTION OF THE PREFERRED EMBODIMENTS

Figure 1:
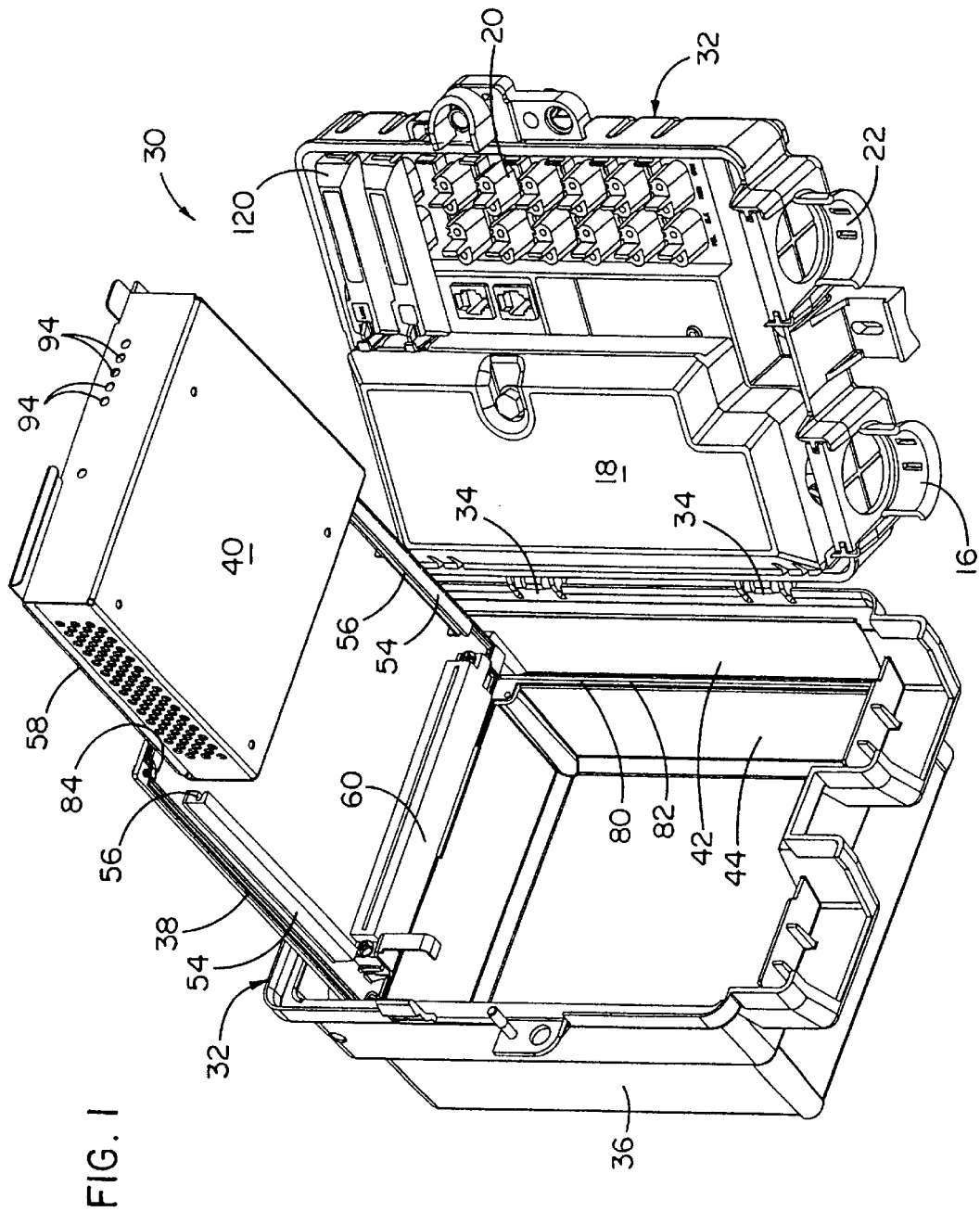
FIG. 1 is a perspective view of an eight-line remote terminal having an improved cover according to an embodiment of the invention showing the door open relative to the cover to provide access to the circuit cavity.

Referring to the figures, wherein like numerals designate like parts, an eight-line remote terminal 30 having an improved cover 32 according to an embodiment of the invention is illustrated in FIG. 1.

Figure 2:
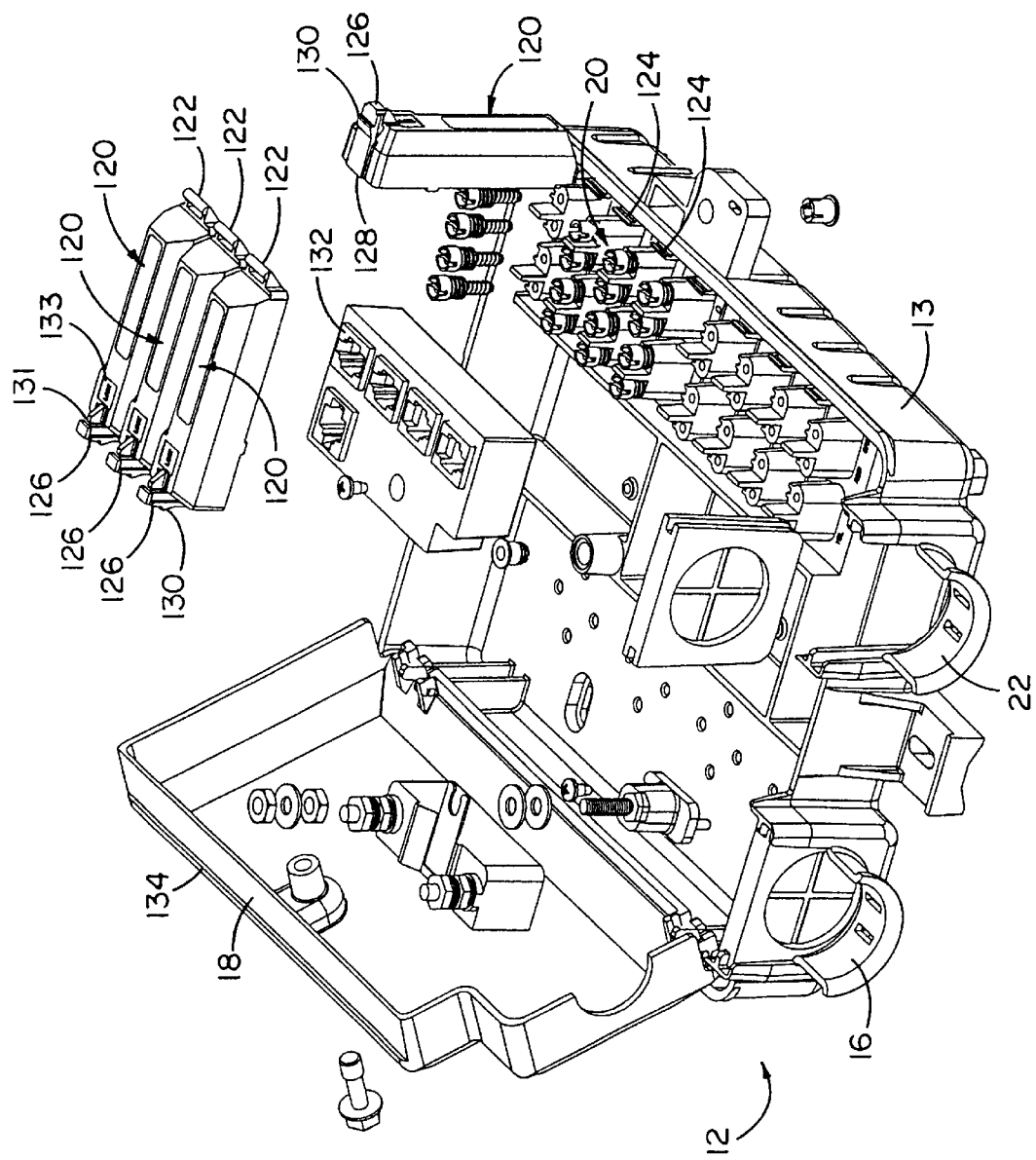
FIG. 2 is an exploded perspective view of an eight-line remote terminal base constructed in accordance with teachings of the invention.

As shown in FIGS. 1 and 2, the remote terminal 30 has a wall-mountable base 12 including a base body 13. The base body 13 is generally shaped like an open-sided box in which equipment is mounted for connecting an individual subscriber line to a particular user line. Traditionally, the left side of the base 12 contains wiring which is in the domain of the telephone company. The right side of the base 12 typically houses individual user lines which are traditionally in the user's domain. Equipment connected from the right side is known as CPE, or "customer premises equipment". The right side wiring is connected to the left side at a central region known as a point of demarcation.

The base 12 receives a subscriber line through a port 16 at a lower left side of the base for connection with a terminal (not shown). At the left side of the base 12, a telephone company cover 18 may be provided to prevent tampering with the telephone company connections. The right side of the base 12 contains a plurality of screw terminals 20 provided to connect individual customer lines. The individual customer lines run from the screw terminals 20 through a port 22 at a lower right side of the base 12 for connection to individual users at a remote location such as, for example, individual apartments in an apartment building.

According to one aspect of the invention, an improved cover is provided which mount to the base while maintaining hingability. Because the cover is preferably designed to replace a conventional flat cover for a remote terminal, the cover 32 has appropriately designed dimensions and hinge fittings 34 to facilitate the substitution for a particular standard flat cover. It will be appreciated that, although the new base 12 preferably is designed to match the conventional closure dimensions, the cover 32 and base 12 could be cooperatively dimensioned otherwise. The improved cover 32 has a box-like shape which is larger than a conventional cover 14 and defines an interior for receiving a circuit module, as described below. Particularly, the cover 14 is adapted to house a card module 40 such as a 400-Series electronics card module for multiplexed network interfacing.

Figure 4:
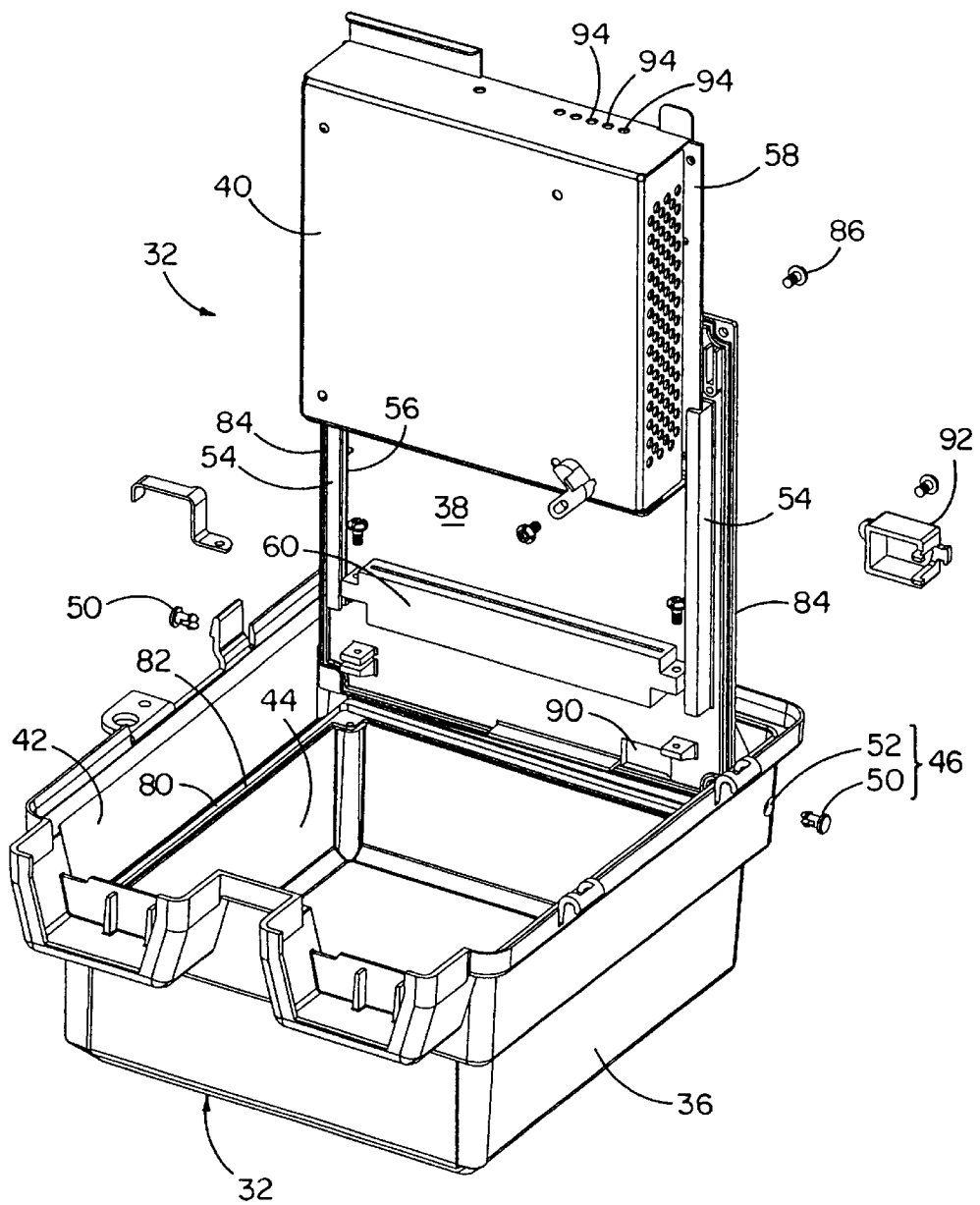
FIG. 4 is a perspective view of a cover according to an alternative embodiment of the invention wherein the hinge includes pins which extend through the cover body and engage into complementary bores in the door.

The one open side matably closes against the base. According to a preferred embodiment, the cover 32 has a door 38 which may be pivoted between open and closed positions to seal the interior of the body 36 at approximately mid-depth. In the open position, the door 38 projects outwardly from the interior, as shown in FIG. 4, to slidably receive the card module 40. In the closed position, the door 38 separates the interior of the cover between a base-receiving recess 42 and a sealable circuit cavity 44. The card module 40 is housed within the circuit cavity 44.

A pair of hinges 46 are provided to pivotally mount the door 38 to the body 36. The hinges 46 are mounted at opposite sides of the door 38. As shown in FIG. 4, each hinge 46 includes a pin 50 which extends through a bore 52 in the body 36 and snap-fits into the door 38 so that ends of the pins 50 rotatably reside in the cooperating bores 52 in the body 36. Via the hinges 46, the door 38 may be pivoted open to provide access to the circuit cavity. As will be appreciated by those skilled in the art, the door 38 can be hingably mounted to the cover body 36 by other appropriate means as well. For example, in the embodiment of FIG. 3, hinges 46' according to an alternative construction are provided at opposite sides of the door 38, each hinge 46' including an outwardly-extending peg (not shown) for respectively engaging the bores in the body 36.

In FIG. 1 which shows the door 38 in an open position, means is shown for mounting the card module 40. A pair of parallel card guides 54 are mounted on opposing sides of the door 38 facing the circuit cavity 44. An elongated slot 56 is formed in each of the card guides 54 for receiving a lip 58 which protrudes from the card module 40. At an end of the door 38 near the hinges 46, a connector block 60 is provided for matably receiving a male connector portion of the card module 48 in a pluggable manner to form an electrical connection. When the door 38 is opened to provide access to the circuit cavity 44, the card module 40 can easily be installed by slidably inserting the card module 40 between the card guides 54 until the card module 40 electrically mates with the connector block 60.

Figure 5:
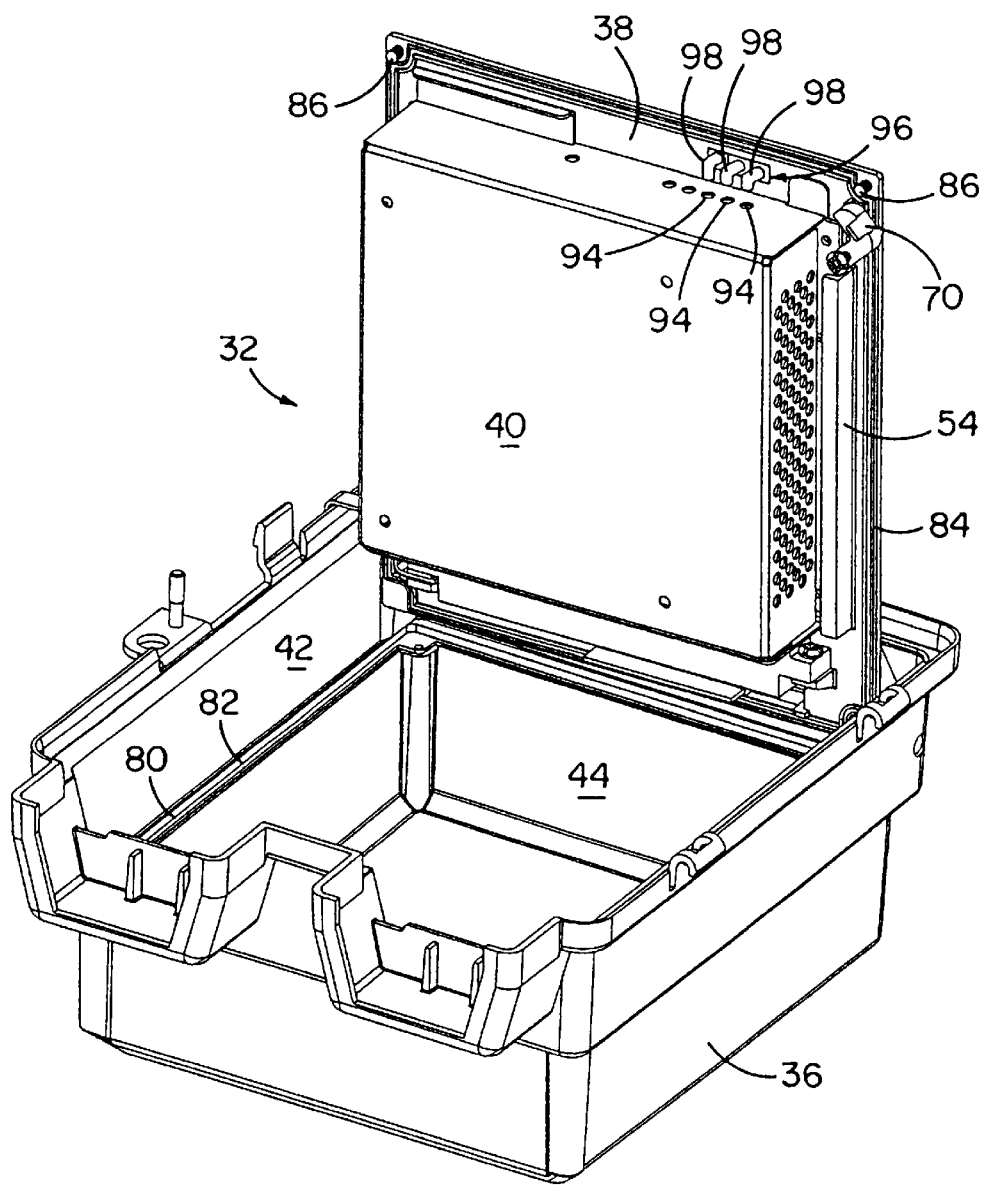
FIG. 5 is a perspective view of an improved cover including a locking element to hold the card in an inserted position and a light pipe element mounted to the door.
Figure 6:
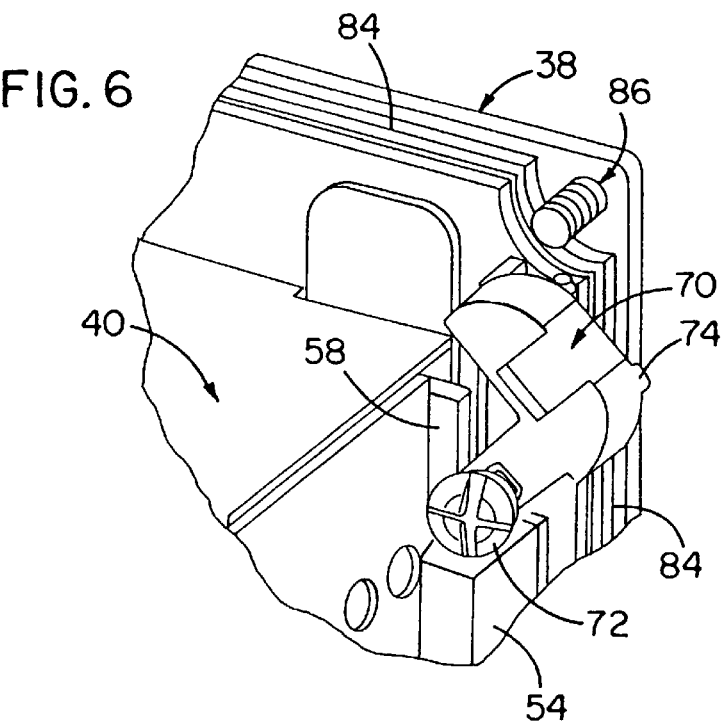
FIG. 6 is an enlarged view of a corner of the door of FIG. 5 showing the locking element in greater detail.
Figure 7:
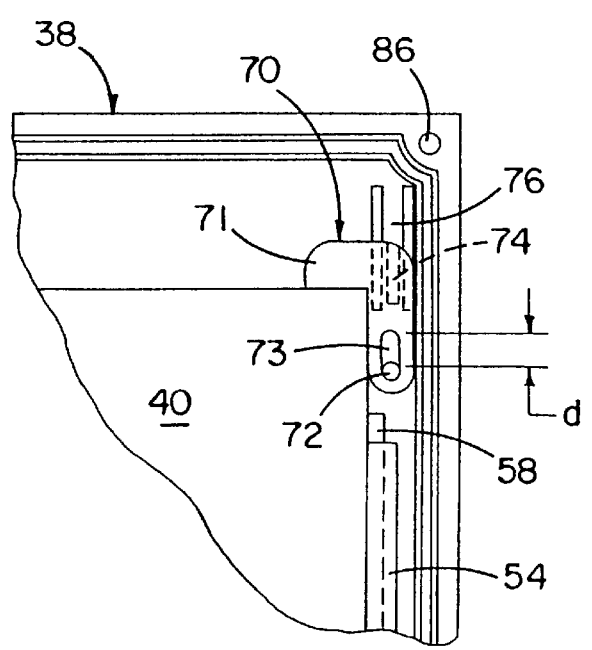
FIG. 7 is a fragmentary side view of the corner of the door of FIG. 6, showing the locking element in a closed position.

As illustrated in FIGS. 5, 6 and 7, a locking element 70 is preferably provided for retaining the installed card module 40 securely between the card guides 54 and engaged with the connector block 60 in an installed position. In the illustrated embodiment, the locking element 70 is L-shaped, having a projecting clamp 71. Furthermore, the locking element is mounted to the door 38 by a threaded screw 72 for rotation between open and closed positions. In the open position shown in FIG. 6, the clamp 71 is disposed outwardly of the module 40 so that the module may be slidably inserted/retracted into the slots. In the closed position, the clamp 71 is disposed inboard of the module 40 to prevent inadvertent retraction of the module 40 from the door 38. As shown in FIG. 7, a screw 72 extends through an oblong hole 73 in the locking element 70 to permit slidable adjustment of the locking element relative to the door 38. The locking element 70 also includes a small tab 74 which slides in a channel 76 disposed in the door 38 parallel to the card guides 54 to linearly guide the locking element 70 for adjustment within the range d permitted by the oblong hole 73. As shown in FIGS. 5 and 6, the locking element 70 is shown in a non-locking position. In the closed position shown in FIG. 7, the tab 74 aligns with the channel 76 and guides the locking element 70 to securely abut against the module 40.

Also, to facilitate convenient access to the circuit cavity 44 for insertion, repair or removal of a card module, the cover 32 may include a catch member (not shown) which selectively holds the door in an open position.

As shown in FIGS. 1, 4 and 5, the cover body 36 has a shoulder 80 disposed about a periphery of the interior walls, which the door 38 abuts against in a closed position. Preferably, the shoulder 80 has a peripheral groove 82 which can be filled with a sealant, such as an epoxy resin, to create a water-tight seal between the body 36 and the door 38 when closed. Accordingly, the door 38 can include a rib 84 (also shown in FIG. 6) positioned near a peripheral edge of the door 38 to matably engage the groove 82 when the door 38 is closed. The rib 84 provides a good gripping surface for the cured sealant. Additionally, the cover 32 may include screws 86 as illustrated in FIGS. 4, 5, and 6, which extend through the door 38 and to the shoulder 80 for threadable tightening of the door 38 in the closed position.

A flexible cable 88 (FIG. 3) is provided to provide electrical communication between the module 40 and the base 12. In particular, the cable 88 carries an appropriate electrical signal to and from the card module 40, passes through an opening 90 (see FIG. 4) in the door 38 and is connected to the connector block 60 for communication with the card module 40. The cable 88 has a sufficient amount of slack to not interfere with the opening and closing of the cover 32 on the base 12. The door 38 includes a cable cap 92 (see FIGS. 3 and 4) forming an enclosed channel through which the cable passes. The cable cap 92 is removable to aid in manipulation of the cable 88 during installation.

Some card modules 40 may have one or more LED indicator 94 which indicate the operation of a certain function by the card module. When the door 38 is closed on the cover body 36, enclosing the card module 40 in the circuit cavity 44, the module 44 and associated LEDs 94 are not directly visible by a repair person. As illustrated in FIG. 5, to permit viewability of these optic indicators 94 while the door 38 is closed, on the body 36, an optional light pipe element 96 may be mounted to the door to provide optical communication through the door 38. The light pipe element 96 is essentially a translucent optic guide which may be made of molded plastic. In the illustrated embodiment, the light pipe element 96 includes three elbow-shaped light channels 98. As shown, each of these light channels 98 has a first end which is viewably positioned in a view opening in the door 38 and a second end which is positioned proximally to a corresponding one o the LED indicators on the card module 40. The viewable first ends of the light pipe element 96 are illuminated when the optic indicators 94 on the card module 40 are active.

As will be understood by those in the industry, the card module 40 may have a push-button switch for actuating a particular circuit feature or operation. For example, a DDL card module may includes an enhanced provisioning function ("EPREP") for use with a digital subscriber line. The push-button on the card module 40 must be pressed to turn off the EPREP function for certain repairs.

Figure 3:
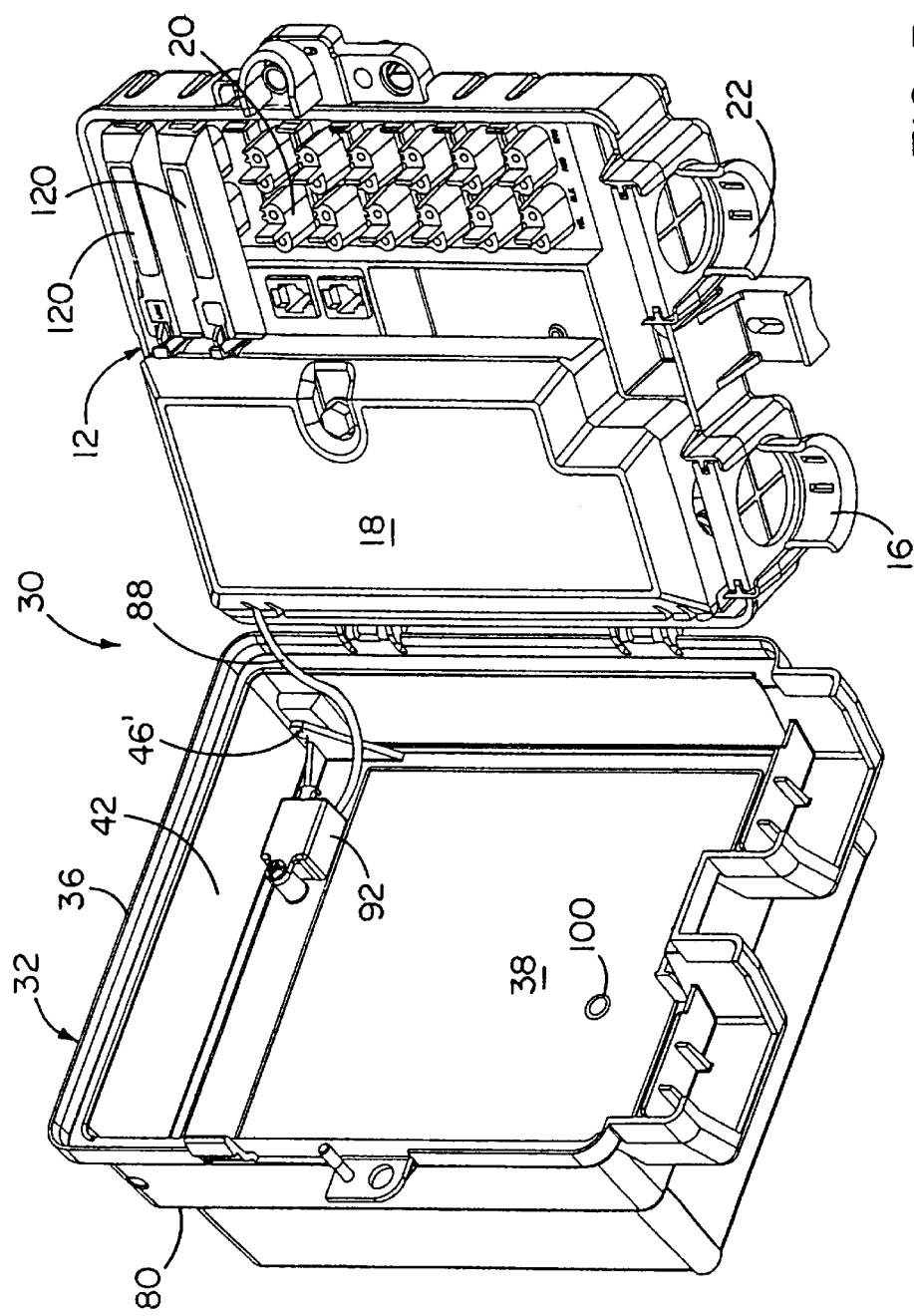
FIG. 3 is a perspective view of the remote terminal of FIG. 2, showing the door in a closed position in the improved cover.

Accordingly, to permit actuation of the push-button while the door 38 is closed on the body 36, a flexible membrane 100, such as rubber or the like, as shown in FIG. 3, is preferably mounted in an opening of the door 38 at a position adjacent the button on the card module 40. The presence of the membrane 100 avoids the need to open the door 38 to access the card module 40, which may be difficult when a sealant has been applied between the shoulder 80 of the body 36 and the door 38.

As shown in FIGS. 1, 2 and 3, a plurality of tip and ring covers 120 are preferably provided to cover the respective screw terminals 20 for each user line. The tip and ring cover 120 permits the respective user to restrict access to his respective telecom connections. Each of the tip and ring covers 120 is pivotable between an open and closed position via a snap-fit hinge 122 formed at a right side thereof. The hinge 122 engages a cooperating channel 124 formed in the base body 13. Each of the tip and ring covers 120 is latchable in the closed position by means of a tab 126 which flexes on a living hinge 128. More particularly, when the tip and ring cover 120 is pivoted downwardly to the closed position, a projecting ridge 130 on the tab 126 snaps under an undercut edge 134 of the telephone company cover 18, securely fixing the tip and ring cover 120 over the respective screw terminals 20 as well as an associated jack 132.

Furthermore, the latched tip and ring cover 120 is lockable to prevent unauthorized access when the telephone company cover 18 is closed. For locking the tip and ring cover 120, the tab 126 has an embossment 131 which receives a portion of an appropriately sized lock 133 (such as for example a No. 10 pedlock), preventing inward movement of the tab 126 which releases the ridge 130 from locking engagement of the undercut edge 134. Advantageously, telephone company personnel can access all of the user connections even when one or more of the tip and ring covers 120 are locked, since all of the tabs 126 are released when the telephone company cover 18 is opened.

While the invention will be described in connection with certain preferred embodiments, there is no intent to limit it to those embodiments. On the contrary, it is recognized that various changes and modifications to the exemplary embodiments described herein will be apparent to those skilled in the art, and that such changes and modifications may be made without departing from the spirit and scope of the present invention. For example, the cover 32 could be designed to receive circuits other than the 400 series card module. Additionally, those skilled in the art will appreciate that the cover made in accordance with the invention can be used to install circuitry for a variety of applications to provide desired communication channels in both analog and digital environments for voice, data and fax applications. Additionally, the cover of the invention could be used to connect an electronics card module on either the telephone company side or the customer side of the point of demarcation. Therefore, the intent is to cover all alternatives, modifications, and equivalents included within the spirit and scope of the invention as defined by the appended claims.

What is claimed is:

1. An improved cover which is hingably mountable to a base portion of a remote terminal, the cover comprising:
a box-like body defining an interior wherein the body has at least one open side and a depth from said open side,
a door extending across the interior intermediately of the depth to define a circuitry cavity to accommodate a circuitry module,
a hinge for mounting the door to the body, and
a pair of parallel card guides fixed to said door, forming a pair of opposing slots adapted to slidably receive cooperatively-shaped lips of said circuitry module.

2. The cover according to claim 1, further comprising a locking element for securing said circuitry module in said slots.

3. The cover according to claim 1, further comprising a female connector block mounted to said door to matably receive a male connector from said circuitry module.

4. The cover according to claim 1, wherein the hinge comprises at least one bore in the door and at least one pin extending rotatably through a hole in the body, the pin being cooperatively received in the bore.

5. The cover according to claim 1, wherein said body has a peripheral shoulder against which the door is received when the door is in a closed position.

6. The cover according to claim 5, further comprising a peripheral sealant groove disposed in the shoulder.

7. The cover according to claim 6, further comprising a rib positioned near a peripheral edge of said door to complementarily extend into said peripheral sealant groove in said shoulder when said door is in a closed position.

8. The cover according to claim 7, further comprising a plurality of screws extending through the door which are threadably engaged into the shoulder to secure the door in a closed position.

9. The cover according to claim 1, further comprising a cable extending between said cavity and said base to carry a signal between said base and said cavity.

10. The cover according to claim 1, further comprising a flexible membrane mounted in an opening in said door through which a button on said module can be manually pressed.

11. An improved cover which is hingably mountable to a base portion of a remote terminal, the cover comprising:
   a box-like body defining an interior wherein the body has at least one open side and a depth from the open side,
   a door extending across the interior intermediately of the depth to define a circuitry cavity to accommodate a circuitry module,
   a hinge for mounting the door to the body, and
   at least one light pipe providing optical communication through said door from said circuitry cavity, wherein the light pipe has first and second ends, and said door has an opening in which a first end of the light pipe is viewably positioned, and wherein a second end of the light pipe is positioned near a light emitting indicator on said module.

12. A remote terminal comprising:
   a base being mountable to a wall,
   line connectors mounted to the base,
   a cover hingably mounted to the base and having an interior adapted to mountably accommodate a circuitry module in operable connection with the line connectors, wherein the cover has at least one open side and a depth from the open side,
   a door extending across the interior intermediately of the depth to define a sealable circuitry cavity to accommodate the circuitry module on one side of the door and a base-receiving recess on an opposite side of the door, and
   a hinge for mounting the door to the cover, and
   a pair of parallel card guides fixed to said door, the card guides forming a pair of opposing slots adapted to slidably receive cooperatively-shaped lips of said circuitry module.

13. The remote terminal according to claim 12, further comprising a locking member for securing an installed module in said slots.

14. The remote terminal according to claim 12, further comprising a female connector block mounted to said door to matably receive a male connector from said circuitry module when said module is received in said slots.

15. The remote terminal according to claim 12, wherein the hinge comprises at least one bore in said door; and at least one pin extending rotatably through a hole in the body and securing within said bore.

16. The remote terminal according to claim 12, wherein said body has a peripheral shoulder against which the door is received in a closed position.

17. The remote terminal according to claim 16, further comprising a peripheral groove disposed in the shoulder.

18. The remote terminal according to claim 17, further comprising a rib positioned near a peripheral edge of said door to complementarily lie in said peripheral groove of said shoulder when said door is in a closed position.

19. The remote terminal according to claim 17, further comprising screws extending through the door which are threadably engaged into the shoulder to secure the door in a closed position.

20. The remote terminal according to claim 12, further comprising at least one light pipe providing optical communication through said door, the light pipe having first and second ends, said door having an opening in which a first end of the light pipe is viewably positioned, and a second end of the light pipe being positioned near a light emitting indicator on said module.

21. The remote terminal according to claim 12, further comprising a flexible membrane mounted in an opening in said body through which a button in said cavity can be manually pressed.

22. The remote terminal according to claim 12, wherein said interior is dimensioned to accommodate a 400-series card module.

23. The remote terminal according to claim 12, further comprising a flexible cable extending between said interior and said base to carry a signal between said base and said cavity.

* * * * *